A. W. HALL.
Siphon for Separating Gold from Crushed Quartz.
No. 44,043. Patented Aug. 30, 1864.
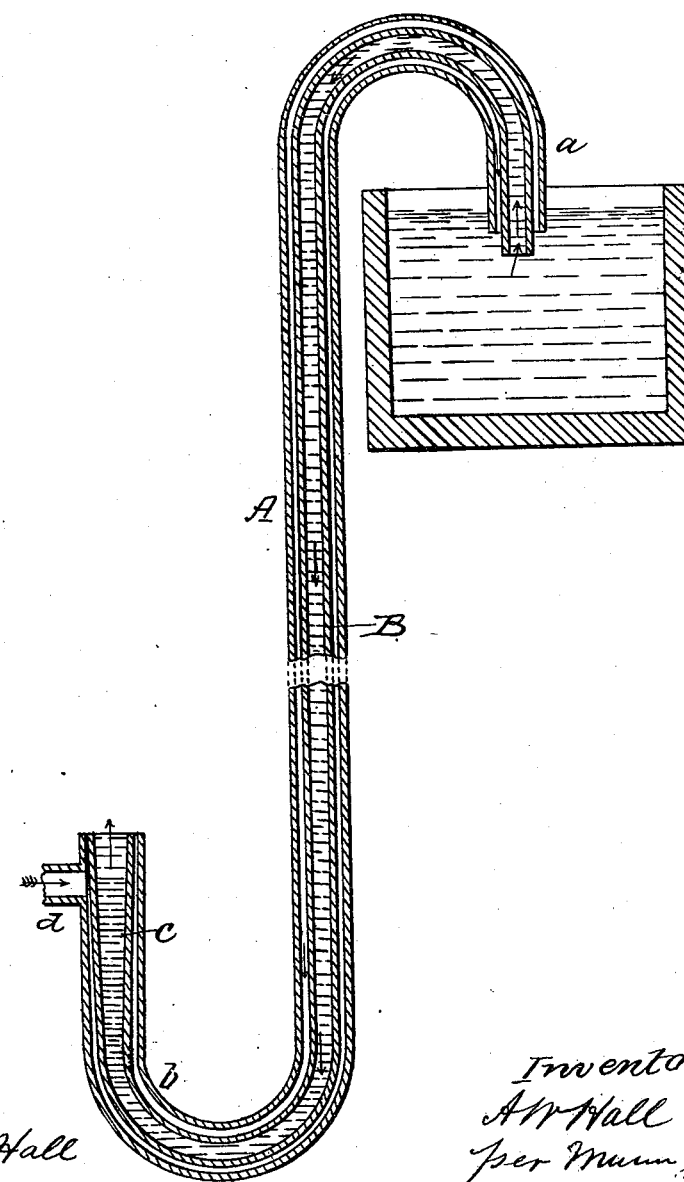

UNITED STATES PATENT OFFICE.

A. W. HALL, OF NEW YORK, N. Y., ASSIGNOR TO HIMSELF AND SAML. JANDON AND B. H. BELDEN, OF SAME PLACE.

IMPROVED SIPHON FOR SEPARATING GOLD FROM CRUSHED QUARTZ.

Specification forming part of Letters Patent No. 44,043, dated August 30, 1864.

*To all whom it may concern:*

Be it known that I, A. W. HALL, of the city, county, and State of New York, have invented a new and Improved Siphon for Separating Gold from Crushed Quartz; and I do hereby declare that the following is a full, clear, and exact description thereof, which will enable others skilled in the art to make and use the same, reference being had to the accompanying drawing, forming part of this specification.

The drawing represents a longitudinal central section of my invention.

This invention relates to a new and improved siphon for separating gold from crushed quartz, and is designed to be applied chiefly to the annular trough of what is generally known as the "Chilian mill."

The object of the invention is to draw off the water at its surface in the trough where the quartz is undergoing the process of crushing, which portion of the water contains the finely-pulverized quartz and fine gold in suspension, and in drawing off said water to separate by amalgamation the gold from the foreign substances.

A represents a metal tube, which may be of any proper length—say three (3) feet. This tube is curved at its upper end, as shown at $a$, and curved at its lower end, as shown at $b$, the two ends being curved in opposite directions.

Within the tube A there is placed a tube, B, which is of the precise form as A, and has its upper end extending down a trifle below the upper end of A, as plainly shown in the drawing, the opposite end of B being even or flush with the corresponding end of A. The part of the tube $b$ of A is enlarged, as shown at $c$, and the curve part $b$ near its end has a flange, $d$, to receive a steam tube or pipe. The inner tube, B, is the siphon proper, and is immersed in the water in the trough of the Chilian mill, as shown in red. A vacuum may be produced in B by means of an air-pump, and within B there is placed a quantity of quicksilver, C, which is kept within the enlarged part $c$ of B by the pressure of the column of water in B. The tube B is kept in a warm state by steam passing through the space between the two tubes A B and the water that passes through B is of course forced through the quicksilver C, and the particles of gold which are held in suspension in the water, being brought in contact with the quicksilver, amalgamate therewith. The heating of the tube B by the steam insures proper amalgamation, and said steam also heats the water in the annular trough and insures amalgamation in that.

If necessary or desired, the tube B may be of copper and have an inner amalgamated surface, so that the amalgamating process may be carried on within the whole length of the tube B. By this simple means the fine gold and quartz held in suspension in the upper part of the water in the trough, where the quartz is crushed, will be drawn off through the siphon, and the gold separated from the foreign substances contained with it in the water.

I claim as new and desire to secure by Letters Patent—

1. A siphon provided with a quantity of quicksilver, and arranged substantially as herein shown and described, for drawing off the pulverized quartz and fine particles of gold held in suspension near the surface of the water in the crushing device, and separating the gold from the foreign substances contained within it in the water, as set forth.

2. The external steam-tube, A, in combination with the internal tube, B, or siphon proper, all arranged substantially as and for the purpose specified.

A. W. HALL.

Witnesses:
JAS. P. HALL,
M. M. LIVINGSTON.